United States Patent [19]

Sheng et al.

[11] 4,022,681

[45] May 10, 1977

[54] PRODUCTION OF MONOAROMATICS FROM LIGHT PYROLYSIS FUEL OIL

[75] Inventors: Ming Nan Sheng, Cherry Hill, N.J.; Walter Anthony Mameniskis, Drexel Hill; Patrick Walter Ryan, Glenn Mills, both of Pa.

[73] Assignee: Atlantic Richfield Company, Los Angeles, Calif.

[22] Filed: Dec. 24, 1975

[21] Appl. No.: 644,252

[52] U.S. Cl. .................................. 208/57; 208/68; 208/111

[51] Int. Cl.² ....................................... C10G 37/06

[58] Field of Search ....................... 208/57, 111, 68

[56] References Cited

UNITED STATES PATENTS

| | | | |
|---|---|---|---|
| 3,132,086 | 5/1964 | Kelley et al. | 208/57 |
| 3,442,794 | 5/1969 | Helden et al. | 208/111 |
| 3,663,423 | 5/1972 | Benett et al. | 208/111 |
| 3,671,419 | 6/1972 | Ireland et al. | 208/57 |
| 3,775,298 | 11/1973 | Morris et al. | 208/111 |
| 3,948,758 | 4/1976 | Bonacci et al. | 208/111 |

*Primary Examiner*—Herbert Levine
*Attorney, Agent, or Firm*—John R. Ewbank

[57] ABSTRACT

A light gas oil, consisting predominantly of alkylated naphthalenes plus minor amounts of thiophene, quinoline, indan, and related naphthalene type carbonaceous compounds, derived from the liquid by-product from olefin production by pyrolysis in steam of a hydrocarbon fraction, is converted to mononuclear aromatic hydrocarbons by a two stage process in which said naphthalene type carbonaceous compounds are first hydrogenated at tetralinizing conditions saturating only one of the two aromatic rings of the feedstock. Said first stage hydrogenation also hydrodesulfurizes and hydrodecontaminates said feedstock. The tetralanized desulfurized normally liquid effluent from the first stage hydrogenation is hydrocracked in the second stage, said hydrocracking being in the presence of a catalyst featuring a stabilizing metal component on an acid-modified mordenite having a silica to alumina unit mol ratio within the range from 15 to 70 as a result of acid leaching of mordenite.

4 Claims, No Drawings

PRODUCTION OF MONOAROMATICS FROM LIGHT PYROLYSIS FUEL OIL

FIELD OF INVENTION

This invention concerns hydrocracking catalysts prepared from acid-modified mordenite, to methods of hydrocracking using such superior catalyst, and to methods for obtaining mononuclear aromatics from the refractory naphthalene type gas oil related to dripolene.

PRIOR ART

Ethylene and related olefins are prepared by pyrolysis to about 760° C of a hydrocarbon fraction in steam. Such steam cracking yields a minor amount of normally liquid by-product, which can be distilled to separate a fraction boiling in the naphtha range, a light gas oil having a boiling range such as 150°–300° C, and a heavy gas oil-residual tar fraction. The naphtha fraction has been known as dripolene. This invention is concerned with the light gas oil.

The dripolene type light gas oil consists predominantly of alkylated naphthalenes (especially $C_{10}H_{(8-n)}(CH_3)_n$ in which the concentration of isomers in which $n$ is 2 is likely to be greater than the concentration of isomers in which $n$ has another value, so the light gas oil is conveniently designated as dimethyl naphthalenes) plus minor amounts of thiophene, quinoline, indene, and related naphthalene type carbonaceous compounds, and is a much more refractory gas oil than a conventional virgin light gas oil. The steam cracking generated light gas oil is ordinarily employed as a low grade fuel oil. A large market exists for mononuclear aromatic hydrocarbons such as xylenes and ethyl benzene. Heretofore there has been no attractive process for converting such refractory light gas oil to mononuclear aromatics, even though it has been known that mononuclear aromatics were among the products prepared by hydrocracking of suitable gas oils.

It has long been known that the hydrocracking method required a catalyst comprising an acidic component and a component decreasing the deposition of carbonaceous deposits in the catalytic zone. The period of operation for a hydrocracking process desirably should be a matter of weeks, as distinguished from the residence time of from a few minutes to about an hour for the residence time of a cracking catalyst in a cracking zone prior to the regeneration of the cracking catalyst. If the cracking activity of a hydrocracking catalyst is inadequate, then the conversion per pass can be objectionably low, leading to the need for recycling an excessive proportion of the effluent. If the carbonaceous deposit is objectionably great, then the intervals between catalyst regeneration treatments and/or catalyst replacement can be too short to be of commercial interest. The suitability of a catalyst for commercial hydrocracking reactions is sometimes evaluated by using tetralin and/or dimethyl tetralin at appropriate conditions and comparing the results with those obtained for a commercial hydrocracking catalyst at equivalent conditions.

Mordenite and derivatives of mordenite have heretofore been employed in transalkalation and isomeryation reactions as disclosed in Brandenburg U.S. Pat. No. 3,476,821, Kmecak, U.S. Pat. No. 3,825,613, and Politzer, U.S. Pat. No. 3,780,122.

SUMMARY OF THE INVENTION

In accordance with the present invention, an acid modified mordenite is stabilized with a suitable metal and employed as a hydrocracking catalyst for converting tetralinized naphthalene type carbonaceous feedstocks stocks to a product containing a measurable proportion of mononuclear aromatic hydrocarbons.

Sodium mordenite, which can be represented by the formula $Na_2Al_2Si_{10}O_{23}$, and which accordingly has a silica to alumina unit mol ratio of 10, may be treated with an acid not merely to remove the major portion of the sodium content but also to bring about a modification of the silica to alumina ratio by reason of the preferentials extration of the alumina from the initial mordenite. The acid leaches some of the alumina to increase the silica to alumina unit mol ratio in the modified mordenite. In accordance with the present invention, such acid modified mordenite should be so prepared that the hydrogen mordenite has a silica to alumina unit mol ratio within the range from about 15 to about 70. Such range is well about the 10 unit mol ratio for natural mordenite and below a high silica to alumina unit mol ratio such as 100. A composition of decreased crushing strength can result from attempts to achieve high ratios such as 100.

The hydrogen mordenite having the required 15 to 70 unit mol ratio is employed as a matrix or carrier for a stabilizing component. Desirably such stabilizing component is a mixture of copper oxide and chromium oxide, the unit mol ratio of the copper oxide to chromium oxide being within the range from about 0.5 to .4, desirably about 2. Interesting results have also been obtained using silver as the stabilizing component. When the stabilizing component is either the mixture of copper and chromic oxides or silver, then the concentration of the stabilizing metal must be within the range from about 2% to about 7%, desirably about 5%. If the stabilizing metal is palladium, then its concentration should be about 0.5%. If the stabilizing metal is nickel, then the concentration should be about 1%. Both palladium and nickel are known to be hydrogenation catalysts. Many hydrocracking catalysts comprise a metal having hydrogenation catalytic activity. In its broadest aspects, the hydrocracking catalyst consists of said acid modified mordenite having a $SiO_2/Al_2O_3$ unit mol ratio from 15 to 70 and from about 0.5 to about 7% hydrogenating metal component. Although silver is sometimes omitted from lists of metals having hydrogenating catalytic activity, silver is a hydrogenation catalyst in such broadest aspects of the present invention.

After the impregnation of the hydrogen mordenite with the stabilizing metal component then the combination is activated by treatment with hydrogen at a temperature from about 350° C to about 500° C for several hours. The thus activated catalyst may be employed in a reaction zone or a hydrocracker and the high boiling hydrocarbonaceous feedstock can be directed to the reaction zone at a space rate of from about 0.5 to about 2 liquid volumes of feedstock per volume of catalyst per hour. The flow of hydrogen through the hydrocracking zone maintains a hydrogen to feedstock unit mol ratio of from about 2 to 5. The hydrocracking method of the present inventions achieves a highly advantageous ratio of monocyclic aromatic to bicyclic aromatics in the product.

As previously noted, the present invention has particular pertinence to the economic conversion of dripolene type light gas oil to mononuclear aromatics.

During the development of the present invention it was discovered that such light gas oil from ethylene production could be employed as an impure grade of dimethyl naphthalenes. Laboratory procedures are simpler using chemical grades of a dimethyl naphthalene as a substitute for the light gas oil, permitting fewer tests concerning said light gas oil.

It has long been known that naphthalene and dimethyl naphthalene could be hydrogenated to tetralin and dimethyl tetralin. It has also been known that at elevated temperatures, there was a propensity for tetralin type compounds to aromatize to naphthalene type compounds whenever the conditions of temperature and/or catalyst tended to promote such aromatization.

By initially subjecting the dripolene type gas oil to a first stage hydrogenation, thereby forming an impure grade of dimethyl tetralin, and thereafter subjecting such tetralinized feedstock to hydrocracking as a second stage, a higher yield of mononuclear aromatic hydrocarbons was obtained than when the dripolene type gas oil was hydrocracked without the preliminary hydrogenation step.

The nature of the invention is further clarified by reference to a plurality of examples.

EXAMPLE 1

A gas oil is subjected to steam hydrolysis for the production of olefins comprising butadiene, propylene, and ethylene. A by-product from such olefin manufacture is a liquid product which is separated to provide a naphtha boiling range product designated as dripolene and a light gas oil having a boiling point range from about 150° C to about 300° C and a residual fraction boiling above 300° C. The light gas oil fraction is predominantly a mixture of alky naphthalenes containing significant amounts of dimethyl naphthalenes.

A light gas oil is subjected to a tetralinization treatment whereby there is the hydrogenization of one of the two aromatic rings in the naphthalene type of molecule and whereby much of the nitrogen content is converted to amnonia, some of the oxygen content is converted to water, and most of the sulphur content is converted to hydrogen sulfide. The operating conditions are such that a large portion of the hydrodecontamination which occurs is hydrosulphurization.

A catalyst consisting of cobaltthio molybdate on alumina is employed as the tetralinization catalyst. The catalyst is initially sulphided by treatment with a mixture of hydrogen and hydrogen sulfide at a pressure of a few atmospheres and a temperature of about 400° C. The liquid hydrocarbon space velocity is about 1.5 volumes of the light gas oil per volume of catalyst per of catalyst per hour. Any other suitable operating conditions for tetralinization are appropriate. It should be noted that a further advantage of the tetralinization step is the hydrodecontamination whereby the amount of oxygen, nitrogen, and sulphur in the feedstock is decreased.

Desirably the product from the tetralinization step will contain less than about 10 parts per million of sulphur.

After the light gas oil is hydrogenated to an alkylated tetralin type of feedstock, it is subjected to hydrocracking. A mixture of about 3 mols of hydrogen per mol of liquid hydrocarbon is directed through the hydrocracking zone at a space rate of about 2 volumes of liquid feedstock per volume of catalyst per hour at a temperature of about 460° C at a pressure of about 68 atmospheres. The effluent flowing from the hydrocracking zone was separated into gaseous products and liquid hydrocarbons. The present invention has advantages including the emphasis upon the proportion of monoaromatic hydrocarbons as distinguished from the bicyclic aromatic hydrocarbons in the liquid effluent. Such bicyclic aromatics are usually scheduled for recycling thru the hydrocracking zone. Because the light gas oil feedstock was deemed a refractory troublsome feedstock for hydrocracking, the two step method proved to be useful in evaluating the suitability of hydrocracking catalysts for the tetralinized feedstock.

In suitable controls, the various catalysts were samples of commercial hydrocracking catalysts. In the present example, the catalyst was prepared by leaching a sodium mordenite and thereafter impregnating the leached mordenite with a mixture of oxides of copper and chromium. The leaching step was conducted employing a liter of 6 normal hydrochloric acid, which was employed to leach 200 grams of sodium mordenite while the mixture was slurried and stirred at about 80° C for 24 hours. The slurry was filtered, and the filter cake was washed with 500 milliliters of distilled hot water. Washing was repeated three times. The filter cake was dried and thereafter reslurried in a liter of distilled water, and the slurry was stirred for 30 minutes. The contents were filtered and the washing procedure was repeated. The leached mordenite was dried at 55° C for 16 and for 8 hours at 150° C.

The leached mordenite had a silica to alumina ratio of 25 to 1, as distinguished from the 10 to 1 ratio of the sodium mordenite which was the starting material. About 95 g. of the dried mordenite was impregnated so that the catalyst consisted of 100 grams, comprising about 5 percent by weight of a mixture of about 2 mols of copper oxide per mol of chromium oxide.

Catalyst particles were prepared by mixing 50 grams of the copper chromite impregnated leached mordenite and 150 grams of alumina trihydrate. The blend was pressed into cylindrical pellets about one-fourth inch in diameter and about one-fourth inch long. The pellets were crushed and sieved to provide the fraction containing particles retained on a 14 mesh screen but passing through an 8 mesh screen. The screened catalyst was calcined at 150° for 15 hours and thereafter increased about 60° C per hour until the temperature was about 540° C and was held at the 540° C for about 2 hours.

The method of preparing the catalyst can be described as involving the steps of: treating sodium mordenite with acid to provide a hydrogen mordenite having a silica to alumina unit mol ratio of about 25, said hydrogen mordenite being represented approximately by a formula of $H_2Al_2Si_{25}O_{53}$; treating the hydrogen mordenite with a metal salt solution to provide a mixture of copper oxide and chromium oxide in which the unit mol ratio of copper oxide is approximately 2, said copper chromite constituting about 5% of the composition; activating the copper chromite mordenite by treatment with hydrogen at a temperature such as about 460° C for about 2 hours to provide an activated hydrocracking catalyst; and employing said activated hydrocracking catalyst for the hydrocracking of the hydrogentated light gas oil partaking the nature of a dimethyl tetraline. Data relating to the controls and the catalysts are set forth in Table 1.

EXAMPLE 2

The catalyst of Example 1 was employed for the hydrocracking of tetralin, which is a more convenient chemical for laboratory testing procedures than the tetralinized light gas oil derived from pyrolysis in the presence of steam for olefine production. The hydrocracking tests, both for the controls and for the present example, were conducted at the same conditions as for Example 1, that is, a ratio of $H_2$/HC of about 3, a LHSV of about 2, a pressure of 68 atmospheres, and a temperature of 460° C. Data relating to the performance of the copper chromite on leached mordenite catalyst for tetralin feedstock are shown in Table 2.

EXAMPLE 3

Mordenite was leached to provide a hydrogen mordenite having a silica to alumina ratio of 25 as in Example 1. The dried hydrogen mordenite was impregnated with 5 percent silver and activated to provide a catalyst following the general method of Example 1. Such catalyst was employed in the hydrocracking of a tetralin at the conditions described in Example 2. Data concerning the results are shown in Table 2.

EXAMPLE 4

The silica to alumina ratio of 25, as in Examples 1–3, was a feature of the hydrogen mordenite of Example 4, which was impregnated to provide palladium in a concentration of 0.5 percent using an impregnating solution of palladium chloride. Such catalyst was employed for hydrocracking tetralin at the process conditions of Example 2 as reported in the data of Table 2.

EXAMPLE 5

The leaching step was conducted at the higher temperature of about 110° C. The aqueous solution consisted of 6 normal hydrochloric acid and the sodium chloride salt leached from the sodium mordenite. Such leaching was continued for about 8 hours, the slurry being stirred during such refluxing at about 110° C. About 60 grams of sodium mordenite was dispersed in 1800 milliliters of 6 normal hydrochloric acid. The washing and drying procedure was essentially those of Example 1. The dried hydrogen mordenite had a silica to alumina unit mol ratio of about 57. In Example 5, the hydrogen mordenite was impregnated with about 5 percent silver. The catalyst was employed for hydrocracking tetralin at the conditions of Example 2 as reported in Table 2.

EXAMPLE 6

The procedure of Example 5 was followed except that the hydrogen mordenite was impregnated with a mixture of copper nitrate and chromium trioxide to provide in the completed catalyst about 5 percent copper chromite having a ratio of copper to chromium of about 2 to 1. Data on the hydrocracking of tetralin over such catalyst are shown in Table 2.

EXAMPLE 7

The hydrogen mordenite having a unit mol ratio of 57 to 1, prepared as described in Example 5 was impregnated with an aqueous solution for palladium chloride and thereafter treated with hydrogen to provide a catalyst containing 0.5 percent palladium. Table 2 shows the results of hydrocracking tetralin at Example 2 conditions over such catalyst.

EXAMPLE 8

The hydrogen mordenite of Example 5 was impregnated and thereafter reduced to provide a hydrocracking catalyst containing 1 percent nickel. Table 2 shows the results of hydrocracking tetralin over such catalyst.

EXAMPLE 9–16

The leached mordenite of the present invention was employed as a carrier in a variety of hydrocracking runs to establish that the leached mordenite was a superior carrier for the hydrocracking step for the two stage process of the present invention. A plurality of runs were conducted with dimethyl tetralin as the feedstock and the favorable results with such technical grades of dimethyl tetraline led to the conclusion that a more refractory feedstock would be advantageous for process evaluation, leading to the selection of a technical grade of decaline for most runs. A plurality of runs using tetralin permitted evaluation of various leached mordenite supports and various catalysts on such supports and various process conditions for confirming the attractiveness of the leached mordenite for the second stage of the two-stage process of the present invention.

Table 1

| | Light gas oil (derived from steam cracking) after hydrogenative tetralinization, subjected to hydrocracking at 3H$_2$/HC, 2LHSV, 430° C, 68 atm | | | |
|---|---|---|---|---|
| Designation | Carrier | Metal | Mole % Selectivity to Monoaromatics | % Conversion to light HC & Monoaromatics |
| Control A | (SiO$_2$)(Al$_2$O$_3$) 0.85 0.15 | 4% Ni | 15 | 16 |
| Control B | CaY | 0.5% Pd | 17 | 33 |
| Control C | Al$_2$O$_3$ | 13% CuCr$_2$O$_7$ | 0 | 12 |
| 1 | 25/1 mord | 5% CuCr$_2$O$_7$ | 99 | 28 |

Table 2

| | Tetralin hydrocracked at 3H$_2$/HC, 2LHSV, 430° C, 68 atm | | | |
|---|---|---|---|---|
| Designation | Carrier | Metal | Mole % Selectivity to Monoaromatics | % Conversion to light HC & Monoaromatics |
| Control D | (SiO$_2$)$_{0.85}$(Al$_2$O$_3$)$_{0.15}$ | 4% Ni | 14 | 15 |
| Control E | CaY | 0.5% Pd | 16 | 34 |
| Control F | Al$_2$O$_3$ | 13% CuCr$_2$O$_7$ | 0 | 13 |

Table 2-continued

| | Tetralin hydrocracked at 3H₂/HC, 2LHSV, 430° C, 68 atm | | | % Conversion to light HC & Monoaromatics |
|---|---|---|---|---|
| Designation | Carrier | Metal | Mole % Selectivity to Monoaromatics | |
| 2 | 25/1 mord | 5% CuCr₂O₇ | 106.5 | 27 |
| 3 | 25/1 mord | 5% Ag | 90 | 25 |
| 4 | 25/1 mord | 0.5% Pd | 65.0 | 28 |
| 5 | 57/1 mord | 5% Ag | 104.2 | 31.1 |
| 6 | 57/1 mord | 5% CuCr₂O₇ | 107.4 | 31.0 |
| 7 | 57/1 mord | 0.5% Pd | 71.3 | 40.7 |
| 8 | 57/1 mord | 1% Ni | 77.6 | 39.0 |

Table 3

| | Dimethyl tetralin hydrocracked at 3H₂/HC, 2LHSV, 455° C, 68 atm | | | % Conversion to light HC & Monoaromatics |
|---|---|---|---|---|
| Designation | Carrier | Metal | Mole % Selectivity to Monoaromatics | |
| 9 | 57/1 mord | 5% Ag | 124 | 72.0 |
| 10 | 57/1 mord | 5% CuCr₂O₇ | 117.2 | 75.02 |

Table 4

| | Hydrocracking tetralin over acid-modified mordenite at 68 atm and 3H₂ HC | | | | | |
|---|---|---|---|---|---|---|
| Example | SiO₂/Al₂O₃ | Metal | °C | LHSV | % selectivity | % conversion |
| 11 | 15 | 5% CuCr₂O₇ | 430 | 2 | 94.3 | 21.0 |
| 12 | 22 | 5% CuCr₂O₇ | 430 | 2 | 95.1 | 30.3 |
| 13 | 57 | 5% CuCr₂O₇ | 455 | 2 | 107 | 38.5 |
| 14 | 57 | 5% Ag | 455 | 2 | 106.7 | 36.3 |
| 15 | 57 | 5% Ag | 455 | 1 | 97.1 | 55.3 |
| 16 | 57 | 5% Ag | 430 | 1 | 96.3 | 47.7 |

In Example 9 the experimental feedstock was dimethyl tetralin which was hydrocracked at 455° C (25° C higher than in most examples) at 68 atmospheres pressure at a hydrogen to hydrocarbon ratio of about 3 to 1, whereby there was both advantageous conversion and advantageous selectivity to monoaromatics. In Example 9 the leached mordenite has a silica to alumina ratio of 57 to 1 and this matrix carried 5% silver as the stabilizing metal. Some of the effluent from the hydrocracking zone included the methane, ethene, ethylene and other light hydrocarbons plus a fraction containing benzene and higher boiling hydrocarbons.

The C₆+ fraction constituted 124 mol percent of the mols of dimethyl tetralin reacted in the process. At the hydrocracking condition in the presence of the advantageous catalyst of the present invention, a portion of the converted dimethyl tetralin can be transformed into two mols of benzene, thus permitting greater than 100% selectivity. The silver mordenite catalysts of Example 9 was outstandingly active in bringing about the conversion of 72% of the dimethyl tetralin to products having boiling points lower than the lowest boiling bicyclic compound. Such lower boiling components of the effluent are designated as a mixture of light hydrocarbons and monoaromatics. Data concerning Examples 9 and 10 are shown in Table 3. The process conditions and results for Examples 11–16 are shown in Table 4.

In Example 14 the conversion was reduced to 36.3% instead of the 72% of Example 9 by employing tetralin as the feedstock instead of dimethyl tetralin. Said Example 14 was conducted using the same catalysts as Example 9, that is a leached mordenite having a 57 to 1 silica to alumina mol ratio and 5% silver, and the hydrocracking was conducted at 455° C at a space rate of 2. The selectivity for the Example 14 was 106.7%, demonstrating that the leached mordenite carrier was phenominally effective for aromatization under the hydrocracking conditions in which fragments in the reaction zone can participate in the aromatization reactions.

As shown in Example 15, using the same 5% silver on 57/1 type leached mordenite, the tetralin was converted to light hydrocarbons and monoaromatics constituting 55.3% of the tetralin feed by decreasing the space rate from 2 to 1 liquid volumes of tetralin per volume of catalysts per hour.

In Example 16 the hydrocracking of tetralin over said 5% silver on 57/1 leached mordenite as a space rate of 1 was conducted at 430° C to achieve a 47.7% conversion to light hydrocarbons and aromatics and to achieve a 96.3% selectivity for monoaromatics.

The data relating to Example 9 are in Table 3 and the data concerning Examples 14, 15 and 16 are in Table 4.

In Example 10, dimethyl was hydrocracked at 455° C at the standard pressure of 68 atmospheres and the standard 3 mols of hydrogen per hydrocarbon at the space rate of 2 liquid volumes of dimethyl tetralin per volume of catalyst per hour. The catalyst was a copper chromite tyupe having 2 mols of chromic oxide per mol of cupric oxide and with a 19 to 1 weight ratio of leached mordenite per weight of copper chromite corresponding to 5% copper chromite. The dimethyl tetralin was thus converted to the extent of 75% of the dimethyl tetralin into a mixture of monoaromatics and light hydrocarbons. For each mol of dimethyl tetralin converted, 1.172 mols of monoaromatics were formed, providing the selectivity of 117.2%. Because only 25% of the dimethyl tetralin was unreacted over this highly advantageous catalyst, a plurality of runs were conducted using tetralin as the feedstock because the data relating to differences in process conditions were more meaningful using tetralin as the feedstock.

In Example 13 tetralin was hydrocracked at the 455° C temperature of Example 10 using the same space rate of 2 and the same copper chromite on 57 unit mol mordenite of Example 10. About 65.1% of the tetralin was recovered in the bicyclic form indicating a conversion of 38.5% to light hydrocarbons and monoaromatics. The mol percent selectivity to monoaromatics in this hydrocracking of Example 13 was 107%.

In evaluating the optimum amount of acid leaching of the mordenite, a hydrogen mordenite having a silica to alumina unit mol ratio of 22 was impregnated with oxides of copper and chromium to provide 5% copper chromite. Such catalysts was prepared by impregnating the hydrogen mordenite with a solution containing cupric ion and chromic oxide in a 1 to 2 ratio so that the impregnating solution can be deemed to be $CuCr_2O_7$. This impregnated mordenite was thereafter activated in the presence of a hydrogen stream to provide the activated catalyst which is conveniently designated as a copper chromite on leached mordenite catalyst.

In Example 12 in which the leached mordenite had a silica to alumina mol ratio of 22, the percent conversion to light hydrocarbons and monoaromatics was 30.3% and the selectivity was 95.1% for monoaromatics. Similarly in Example 11 the usefulness of a silica to alumina unit mol ratio as low as 15 was established by hydrocracking tetralin to achieve a 21% conversion at 94.3% selectivity at 430° C, a space velocity of 2 LHSV, 68 atmospheres, and a hydrogen to hydrocarbon ratio of 3.

By a series of tests, appropriate limits are established for some of the variables investigated including some of the variables illustrated by the different examples as previously discussed. The data from the series of runs established that the silica to alumina unit mol ratio in the acid leached hydrogen mordenite should be within the range from 15 to 70. The hydrogen mordenite resulting from the acid treatment can be represented by a formula $H_2Al_2Si_nO_{3+2n}$ in which $n$ is within the range of 15 to 70.

The hydrogen mordenite must be impregnated with a solution of a metal salt to provide a stabilized composition containing from about 0.5 to about 7% of a stabilized metal component. This metal component must be a hydrogenization catalyst such as copper, chromic oxide, silver, nickel, palladium, or mixtures thereof. The hydrogenization catalyst is desirably selected from said group of recited metals or mixtures thereof, as illustrated by the various examples.

After the leached hydrogen mordenite carrier has been impregnated with from about 0.5 to about 7% of such stabilizing metal component, the hydrocracking catalyst is activated by treatment with hydrogen at a temperature from about 350° C to about 500° C for several hours to provide an activated hydrocracking catalyst. The present invention is applicable to the naphthalene type hydrocarbonaceous compounds which are in the light gas oil by-product from olefin production by pyrolysis in steam of a hydrocarbon fraction. That is, the present invention is concerned with the conversion of a gas oil of the dripolene type. The present invention features a two stage process in which such dripolene type light gas oil is first subjected to a hydrodesulfurization step for hydrogenating such naphthalene type hydrocarbonaceous compounds at tetralinizing conditions saturating one of the two aromatic rings of the naphthalene hydrocarbons. The prior literature describes a considerable variety of catalyst and process conditions for simultaneously hydrodesulfurizing a feedstock and converting the naphthalene type constituents thereof to tetralin type components, that is achieving the saturation of one of the two aromatic rings of the naphthalene type hydrocarbons. The present invention can employ whichever type of tetralinizing hydrogenization process seems most appropriate at the particular location at which the process should be conducted. Particular attention is focused upon the combination of a first stage tetralizining hydrogenization and a second stage hydrocracking and more particularly upon the utilization of acid leached mordenite having a silica to alumina unit mol ratio within the range from 15 to 70 in the hydrocracking of the tetralinized feedstock as the carrier for the catalyst in the hydrocracking step of the second stage of the process.

A wide range of conditions can be employed in the hydrocracking step by reason of the versatility and outstanding activity, selectivity, and stability of the 0.1 to 7% stabilizing metal on acid leached mordenite having the desired 15 to 70 unit mol ratio. The liquid hydrocarbon space velocity should be within the range from about 0.5 to about 2 liquid volumes of feedstock per hour. The temperature for the hydrocracking should be within the range from 350° to 500° C. The hydrogen to hydrocarbon unit mol ratio in the hydrocracking zone should be within the range from about 2 to about 5. The hydrocracking should be conducted at a pressure from about 50 atmospheres to about 100 atmospheres.

It should be noted that the acid leaching is desirably conducted to achieve a silica to alumina unit mol ratio of about 57, as shown in Examples 5, 6, 7, 8, 9, 10, 13, 14, 15 and 16.

One of the outstanding advantages of the present invention is the attainment of a monoaromatic $C_8$ fraction containing a relatively high percentage of ethyl benzene. Several types of hydrocarbon conversions lead to the formation of aromatic hydrocarbons comprising a $C_8$ fraction in which the distribution of the 4 isomers that is the ortho, meta, and paraxylenes, and ethyl benzene resembles the isomer distribution in a $C_8$ aromatic fraction derived from a virgin petroleum. One remarkable result of the present invention is the production of $C_8$ aromatic fraction containing more ethyl benzene than the combined concentrations of the three xylene isomers. Suprisingly, the ratio of ethyl benzene to xylenes is more than 2 to 1 in the $C_8$ fraction of the monocyclic aromatics from the normally liquid affluent from the hydrocracking zone in each of the 16 examples.

Various modification of the invention are possible without departing from the scope of the appended claim.

The invention claimed is:

1. The method converting naphthalene type hydrocarbonaceous compounds in the light gas oil byproduct from olefin production by pyrolysis in steam of a hydrocarbon fraction which method includes the steps of:

treating sodium mordenite with acid to provide a hydrogen mordenite having a silica to alumina unit mol ratio greater than 15 but less than 70, said hydrogen mordenite being represented approximately by a formula $H_2Al_2Si_nO_3{}^+{}_{2n}$ in which $n$ is within the range from 15 to 70;

treating said hydrogen mordenite with a solution of a salt of at least one hydrogenating metal to provide stabilized composition containing from about 0.5% to about 7% of a stabilized hydrogenating metal component;

activating said stabilized metal mordenite by treatment with hydrogen at a temperature from about 350° C to about 500° C for several hours to provide an activated hydrocracking catalyst;

hydrogenating said naphthalene type hydrocarbonaceous compounds at tetralinizing conditions saturating one of the two aromatic rings of the naphthalene type hydrocarbons, said tetralinizing conditions also hydrodesulfurizing said hydrocarbons to provide a desulfurized tetralinized feedstock;

subjecting said desulfurized tetralinized feedstock to hydrocracking over said activated hydrocracking catalyst by directing said feedstock through a reaction zone containing a fixed bed of said activated hydrocracking catalyst of from about 350° to 500° C at a liquid hydrocarbon space velocity of from about 0.5 to about 2 liquid volumes of feedstock at a hydrogen to feedstock unit mol ratio of from about 2 to about 5 to achieve an advantageous ratio of monocyclic aromatics to bicyclic aromatics in the normally liquid effluent from said reaction zone.

2. The method of claim 1 in which the feedstock consists predominantly of partially hydrogenated bicyclic aromatic hydrocarbons derived from the bottoms fraction from the steam cracking of a carbonaceous feedstock to produce ethylene.

3. The method of claim 1 in which the ratio of ethyl benzene to xylenes is more than 2 to 1 in the $C_8$ fraction of said monocyclic aromatics in said normally liquid effluent from said hydrocracking zone.

4. The method of claim 1 in which the hydrogenating metal is selected from copper, chromium, palladium, silver, nickel and mixtures thereof.

* * * * *